Patented May 13, 1930

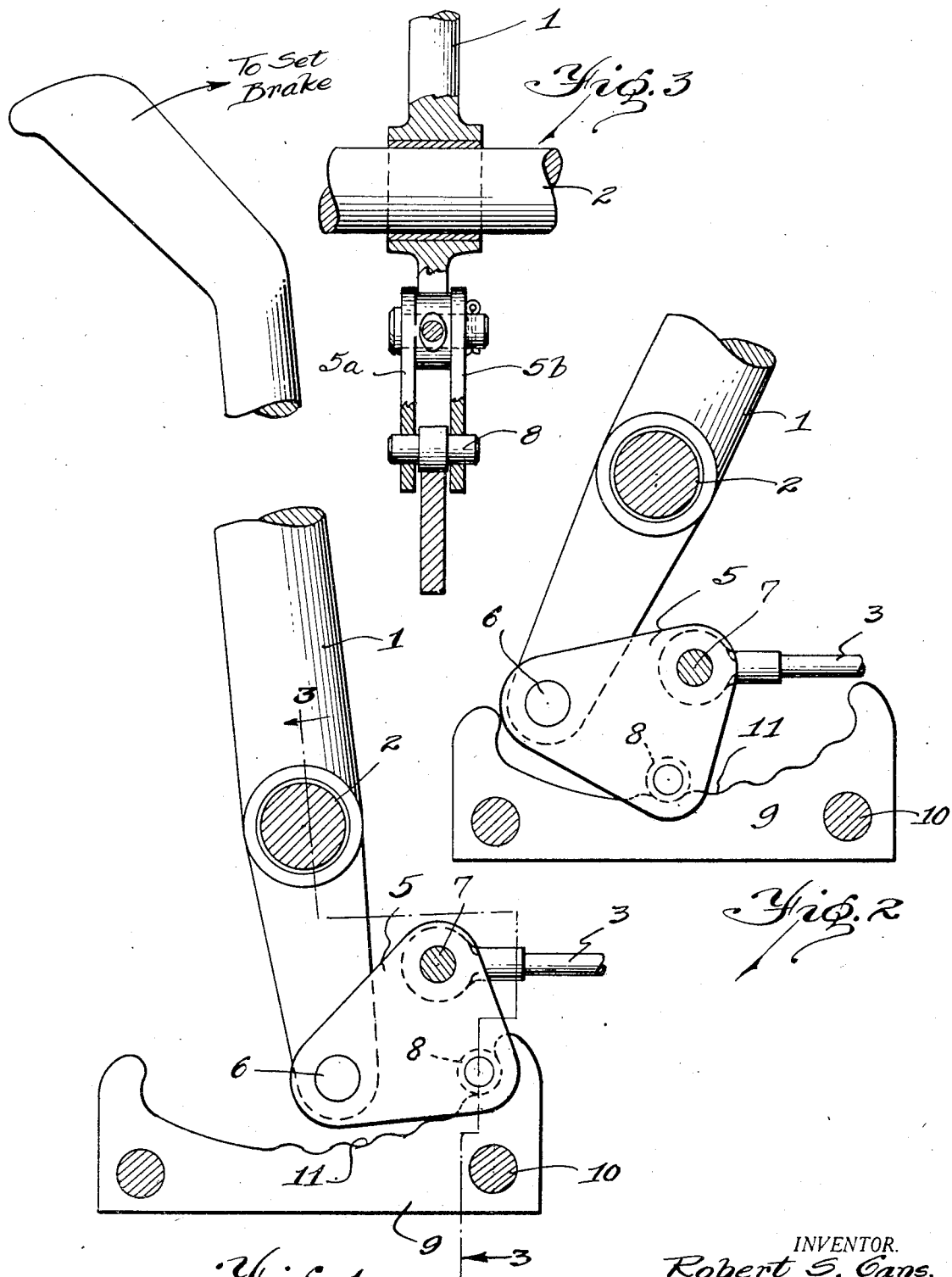

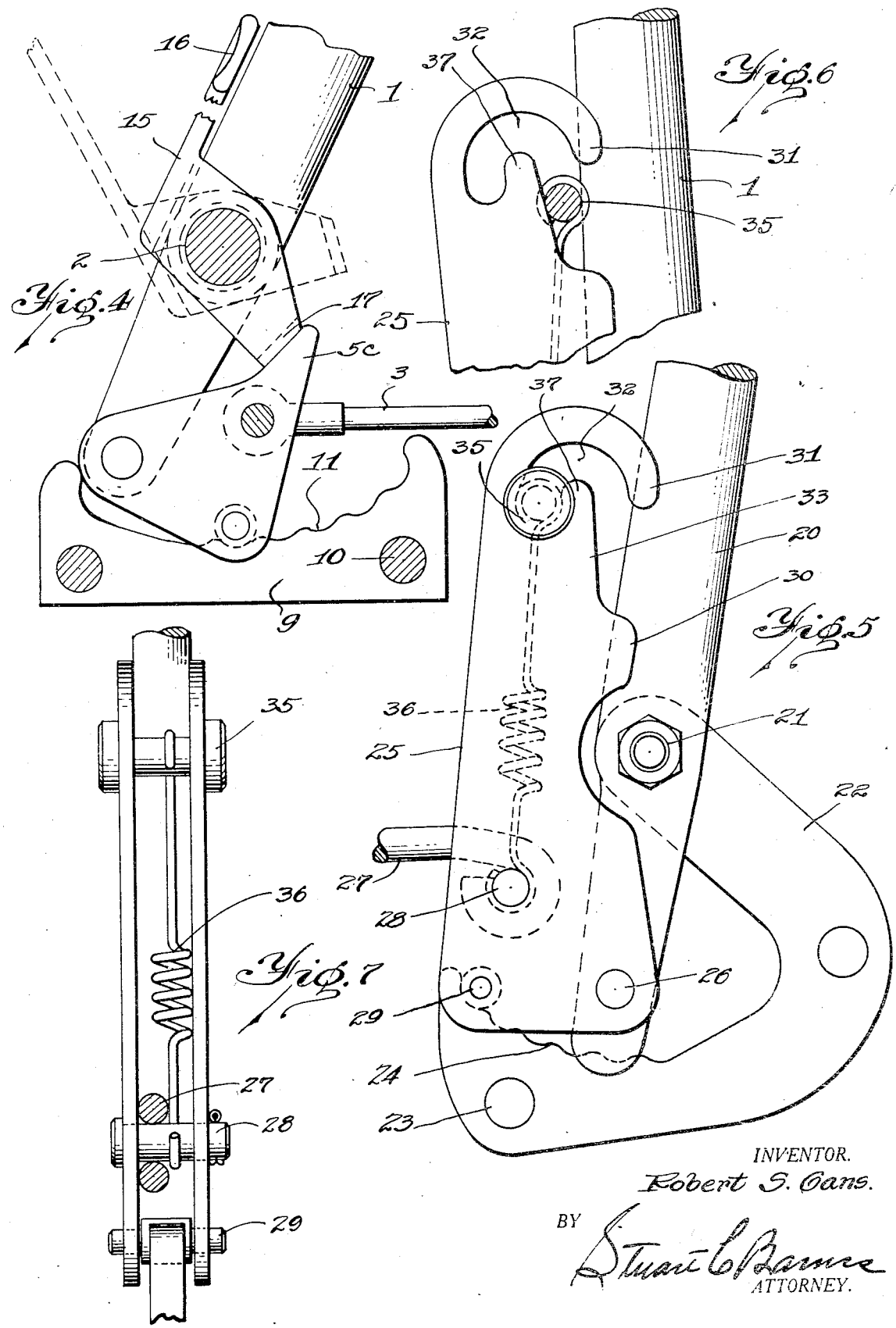

1,758,694

UNITED STATES PATENT OFFICE

ROBERT S. GANS, OF DETROIT, MICHIGAN

MECHANISM FOR CONTROLLING BRAKES OR THE LIKE

Application filed November 18, 1927. Serial No. 234,119.

This invention has to do with a mechanism for controlling brakes or the like.

An object of the invention is the provision of such a mechanism which employs an operating lever which can be moved to various positions and which, by reason of the mechanism, will remain in the position in which it is placed. This is accomplished without employing a latching mechanism which has to be manipulated by the operator, so that all that is required of an operator is to merely shift the lever to the desired position.

A mechanism of this character is described and claimed in my copending application Serial No. 114,138, filed June 7, 1926. This present invention, however, is directed toward a different and improved construction. Although this mechanism is such as to automatically lock itself in any position in which it is placed, yet permitting movement from place to place by an operator without unlocking the mechanism, the invention contemplates an additional positive locking arrangement which can be used whenever desired to positively prevent accidental movement of the mechanism. An example of this can be given when considering the mechanism mounted for operating the brakes of an automotive vehicle. To set the brakes the lever is moved to proper position and automatically stays in this position to hold the brakes set. If, however, the vehicle is to be left for a period of time, and it be desirable to positively insure against accidental release of the brakes, this separate locking device may then be used.

In the accompanying drawings:

Fig. 1 is a side elevation of the mechanism showing an operating lever, a brake rod with interposed mechanism operatively connecting the lever and brake rod.

Fig. 2 is a view similar to Fig. 1 showing the mechanism set with the brakes applied.

Fig. 3 is a view taken partly on line section 3—3 of Fig. 1 and showing also the lever mounting.

Fig. 4 is a side view of the mechanism similar to that shown in Figs. 1 and 2, and also showing an additional positive locking means.

Fig. 5 is a view of a modified construction embodying the same principles as the foregoing forms but which is modified so as to include a different form of positive locking means.

Fig. 6 is a view showing the locking arrangement of Fig. 5 in locked position.

Fig. 7 is a plan view taken at right angles to Fig. 5.

This mechanism is operated by a simple action by pulling and pushing of the lever by means of a handle formation on its upper end. A pull on the lever applies the brakes and a push on the lever releases the brakes. In Fig. 1 the mechanism is shown in "off" position, or in other words, with the brakes not applied. To apply the brakes the lever is pulled from left to right causing the lower end of the lever to move from right to left. This movement causes the roller to ride along over the corrugations and also pulls the brake rod from right to left to thus apply the brakes.

It will be noted that the brake rod is connected to the intermediate member 5 at a point which is out of line with the point where the intermediate member is connected to the lever. In other words, the pivotal points 7 and 6 are in disalignment so that tension on the brake rod tends to swing the intermediate member around the pivotal connection 6. The tendency of this movement is prevented because the roller 8 contacts with the corrugated member 9. The two pins and the roller are in triangular arrangement, and when the brakes are applied the roller rests in one of the furrows of the corrugated portion and it is urged tightly down into this furrow so that the mechanism stays in position and holds the brakes in "on" position. The greater the pull by the brake rod, the more secure the holding action. The roller thus acts as a fulcrum point for the intermediate member 5. A pull on the brake rod is divided into component parts so that the roller is urged downwardly into a furrow and an upward force is on the pin 6 substantially directly toward the fulcrum point 2 of the lever. This force will be overcome by the fixed fulcrum and by the fixed position of the roller in a furrow. In order to release the brake, however, it is merely necessary to push the upper end of the lever from right to left.

Should it be desirable to positively insure against the release of the brakes by accidental movement of the lever from right to left, as above described, a separate positive locking means can be provided, such as shown in Fig. 4. This locking device may take the form of a member 15 pivoted at the fulcrum point of the lever and provided with an operating part 16 and a part 17 for engagement with the intermediate member 5 which may be slightly changed in shape to provide an upwardly extending portion 5ᶜ. When this locking device is in the position shown in dotted lines the mechanism is free to operate in the manner as just above described, and sufficient friction can be provided at the place where the member 15 is positioned to hold it in position. After the brakes are set, this member may be rocked on its pivot so that the abutment 17 engages the projection 5ᶜ. This positively prevents the member 5 from raising to permit the roller to move out of the furrow even though a pushing force is applied to the upper end of the lever. In order to release the brakes the member 15 must be actuated to about the position shown in dotted lines so as to free the abutment 17 from the projection 5ᶜ.

As will be seen by reference to Figs. 5 and 6, the lever 20 is fulcrumed, as at 21, on a member 22 held in place by rivets or bolts, 23, this member having a corrugated portion 24. The intermediate member 25 is somewhat elongated so as to extend upwardly along side of the lever. The lever is pivoted to the intermediate member, as at 26, and the brake rod 27 is pivoted to the intermediate member, as at 28. The roller 29 carried by the intermediate member engages the corrugated portions 24. As thus far described, this device operates in a manner as above described with reference to the mechanism shown in Figs. 1 and 2.

The intermediate member 25 is preferably made of two like stampings which correspond to the structure of Figs. 1 and 2. These stampings may be provided with projecting portions 30 and 31 for the purpose of engaging opposite sides of the lever. The members are cut away to provide a channel 32 which affords a surface 33 disposed at an angle to the adjacent portion of the lever.

A locking pin 35 is disposed in this channel, and preferably a light spring 36 connects this locking pin with some convenient portion of the mechanism, as for example, the pin 28 which connects the brake rod with the mechanism. The channel in which the pin is mounted is shaped to provide an abutment 37.

When the pin is in the position shown in Fig. 5 the construction operates in the usual manner as above described. When the brakes are applied, however, and it is desired to positively lock the mechanism against release, the locking pin is moved over the abutments 37 and dropped in the space bounded on one side by the lever and on the other side by the slanting surface 33. When an attempt is made to release the brakes, the roller 29 tends to ride up upon an adjacent ridge of the corrugated portion, and to do this it must swing the members 25 around pivot point 26 so that the upper ends of these members swing in toward the lever. This is positively prevented by reason of the pin being in the position as shown in Fig. 6. Thus accidental release of the mechanism is prevented.

This construction is fully operative without the use of the pin inasmuch as the brakes can be applied, held applied and released by the mere act of pushing the lever back and forth. The pin need never be used except when positive locking action is desired.

The spring 36 is not necessary to the operation of the device, but it is used primarily to hold the locking pin tightly in the position shown in Fig. 5 so that it will not rattle during operation of the automotive vehicle. This is a light spring and permits the locking pin to be easily raised over the projections 37. Also the spring may aid in pulling the pin downwardly, when it is in the position shown in Fig. 6, but this is not essential because the pin will serve as a positive lock with or without the spring.

It has been found advantageous to describe this mechanism in connection with, and for the purpose of operating the brakes of a vehicle, but it is not intended that the mechanism of the invention be limited to such use. It is clear that the mechanism can be employed for the purpose of actuating mechanism other than the brakes of a vehicle.

Claims:
1. A control mechanism for brakes or the like, comprising in combination a lever, a brake rod, an intermediate device pivotally connected to the lever and pivotally connected to the brake rod, a member provided with a corrugated surface, means on the intermediate device for slidably engaging this corrugated surface upon movement of the lever, the two points of pivotal connection and the means on the intermediate device being arranged in a fixed triangle whereby the pull of the brake rod causes the means of the intermediate device to engage and lock in a furrow of the corrugated member, the relative relation between the depth of furrows of the corrugated surface and the said means which engages the same being such that the said means moves along the corrugated surface in either direction upon application of power to the lever.

2. A control mechanism comprising in combination a rigid lever having a fixed fulcrum point, controlled means, an intermediate device connected to the lever and to the controlled means, a member having a corrugated surface with which the intermediate device contacts and along which it slides upon operation of the lever, this intermediate device being connected with the other members in such a way that a pull of the controlled means seats the intermediate device in a furrow of the corrugations and tends to swing the same on a fulcrum point located at this furrow, the fulcrum of the lever being positioned so as to substantially directly overcome this swinging movement without substantial tendency to swing the lever on its fulcrum, the corrugated surface having furrows and ridges of such construction as to permit the intermediate device to slide along same upon application of power to the lever in either direction.

3. A control mechanism, comprising in combination a lever, a brake rod, an intermediate device to which the lever and brake rod are connected, a member having a corrugated surface, and a roller on the intermediate device which engages this corrugated surface, the points of connection of the lever and brake rod and the roller being arranged in a triangle fixed relative to each other and the arrangement being such as to cause the roller to seat in any one of the furrows by reason of pull of the brake rod whereby to lock the mechanism.

4. A control mechanism for brakes or the like, comprising in combination a lever, a brake rod, an intermediate device to which the lever and brake rod are connected, a member having a corrugated surface with which the intermediate device contacts, the said intermediate device being adapted to seat in any one of the furrows to lock the mechanism against pull of the brake rod, and positive locking means for preventing said intermediate device from raising out of the furrow whereby to lock the mechanism against power applied to the lever.

5. A control mechanism for brakes or the like, comprising in combination a lever, a brake rod, an intermediate device to which the lever and brake rod are connected, a member having a corrugated surface with which the intermediate device contacts, the said intermediate device being adapted to seat in any one of the furrows to lock the mechanism against pull of the brake rod, and positive locking means for preventing said intermediate device from raising out of the furrow whereby to lock the mechanism against power applied to the lever, said locking means being normally inoperative but being arranged to be brought into operation only when desired.

6. A control mechanism for brakes or the like, comprising in combination a lever, a brake rod, an intermediate device to which the lever and brake rod are connected, a member having a corrugated surface with which the intermediate device contacts, the said intermediate device being adapted to seat in any one of the furrows to lock the mechanism against pull of the brake rod, and positive locking means insertable between the intermediate device and lever to lock the intermediate device in a furrow to prevent movement of the mechanism by power applied to the lever.

7. A control mechanism for brakes or the like, comprising in combination a lever, a brake rod, an intermediate device to which the lever and brake rod are connected, a member having a corrugated surface with which the intermediate device contacts, the said intermediate device being adapted to seat in any one of the furrows to lock the mechanism against pull of the brake rod, and positive locking means insertable between the intermediate device and lever to lock the intermediate device in a furrow to prevent movement of the mechanism by power applied to the lever, said positive locking means being in the form of a pin and normally held by the intermediate device in an inoperative position and movable into locking position.

8. A control mechanism for brakes or the like, comprising in combination a lever, a brake rod, an intermediate device to which the lever and brake rod are connected, a member having a corrugated surface with which the intermediate device contacts, the said intermediate device being adapted to seat in any one of the furrows to lock the mechanism against pull of the brake rod, and positive locking means insertable between the intermediate device and lever to lock the intermediate device in a furrow to prevent movement of the mechanism by power applied to the lever, said positive locking means being in the form of a pin and normally held inoperative by the intermediate device and movable into locking position, and spring means acting on this pin and serving to hold the same in either operative or inoperative positions.

In testimony whereof I affix my signature.
ROBERT S. GANS.